United States Patent [19]
Wake et al.

[11] Patent Number: 5,785,282
[45] Date of Patent: Jul. 28, 1998

[54] HALF-PLOW VORTEX GENERATORS FOR ROTORCRAFT BLADES FOR REDUCING BLADE-VORTEX INTERACTION NOISE

[75] Inventors: Brian E. Wake, Portland; Peter F. Lorber, Coventry; Anton J. Landgrebe, South Windsor, all of Conn.

[73] Assignee: Sikorsky Aircraft Corporation, Stratford, Conn.

[21] Appl. No.: 693,579

[22] Filed: Aug. 7, 1996

Related U.S. Application Data

[63] Continuation-in-part of Ser. No. 517,026, Aug. 18, 1995.
[51] Int. Cl.$^6$ .................................................... B64C 23/00
[52] U.S. Cl. ........................... 244/199; 244/130; 244/200
[58] Field of Search ................................ 244/199, 130, 244/200, 198

[56] References Cited

U.S. PATENT DOCUMENTS

| | | | |
|---|---|---|---|
| 2,800,291 | 7/1957 | Stephens | 244/200 |
| 4,354,648 | 10/1982 | Scherk et al. | 244/199 |
| 5,058,837 | 10/1991 | Wheeler | 244/199 |

FOREIGN PATENT DOCUMENTS

| | | | |
|---|---|---|---|
| 806206 | 7/1949 | Germany | 416/236 |

OTHER PUBLICATIONS

"Force Mixing In Boundary Layers" by G.B. Schubauer and W.G. Spangenberg National Bureau of Standard Report Aug. 8, 1958.

"The Use of Vortex Generators To Delay Boundary Layer Separation" by D.G. Gould. National Aero Establishment Report LR-183 Dec. 19, 1956.

*Primary Examiner*—Robert J. Oberleitner
*Assistant Examiner*—Tien Dinh
*Attorney, Agent, or Firm*—Terrance J. Radke

[57] ABSTRACT

In one embodiment for a helicopter main rotor assembly, a half-plow vortex generator is mounted in combination with the upper aerodynamic surface of each main rotor blade and is operative to generate a primary corotating vortex of sufficient strength to interact with and dissipate the tip vortex generated by the same main rotor blade, thereby reducing blade-vortex interaction noise radiating from the helicopter main rotor assembly. The half-plow vortex generator has a right triangular planform configuration defined by a length, a width, and an apex angle. The three-dimensional configuration of the vortex generator is further defined by an apex height. The apex height is the primary determinant of the strength of the generated primary corotating vortex and is defined in terms of the magnitude of the local chord where the vortex generator is mounted. The apex height preferably has a magnitude within the range of about 0.01 to about 0.08 of the magnitude of the local chord. The length, width, and apex angle are secondary determinants of the strength of the primary corotating vortex generated by the half-plow vortex generator. The length and width of the vortex generator are also defined in terms of the magnitude of the local chord, the length preferably having a magnitude within the range of about one-fourth to about one-half of the magnitude of the local chord and the width preferably having a value of about one-third of the length of the vortex generator. The apex angle preferably has a value within the range of about twenty to about thirty degrees. The mounting site for the half-plow vortex generator is defined in terms of the length of the local and tip chords. The vortex generator is mounted inboardly from the tip of the main rotor blade a spanwise distance having a magnitude preferably within the range of about one-half to about equal to the tip chord length and is mounted with the length thereof in substantial alignment with the local chord. The apex of the vortex generator is mounted inwardly from the leading edge of the main rotor blade by a chordal distance having a magnitude of about one-quarter of the magnitude of the local chord.

17 Claims, 3 Drawing Sheets

HALF-PLOW VORTEX GENERATORS FOR ROTORCRAFT BLADES FOR REDUCING BLADE-VORTEX INTERACTION NOISE

RELATED APPLICATION

The present application is a continuation-in-part of U.S. patent application Ser. No. 08/517,026, filed 18 Aug. 1995, entitled HALF-PLOW VORTEX GENERATORS FOR ROTOR BLADES FOR REDUCING BLADE-VORTEX INTERACTION NOISE.

TECHNICAL FIELD

The present invention is directed to means for reducing the noise radiated from rotating blades, and more specifically, to half-plow vortex generators that are mounted in passive or active combination with rotorcraft blades, especially helicopter and tiltrotor aircraft blades, and operative to reduce the blade-vortex interaction noise radiated from such rotorcraft blades.

BACKGROUND OF THE INVENTION

One concern of aircraft designers is to reduce, to the extent practicable, the noise radiating from the main rotor assembly of a rotorcraft such as a helicopter or tiltrotor aircraft during flight operations. For rotorcraft flight operations, a significant noise level is radiated during maneuvers and low speed, descending flight profiles associated with landing operations, e.g., a descent mode. The noise generated during the descent mode may be particularly objectionable inasmuch as landing flight operations typically occur in populated areas. A paramount component of the noise radiated from a rotorcraft during a low speed, descending flight profile is due to blade-vortex interaction (BVI) noise.

During typical rotorcraft flight operations, the rotation of the rotor blades of the main rotor assembly, due to the airfoil profile and angle of attack of the rotor blades, creates a high velocity, low pressure field over the upper aerodynamic surface of each rotor blade and a low velocity, high pressure field over the lower aerodynamic surface of each rotor blade, i.e., positive loading over the rotor blade span. The pressure differential acting upon the rotor blades provides the necessary lift forces for rotorcraft flight operations. Unfortunately, this pressure differential also causes the generation of vortices at the tips of the rotor blades.

At the tip of each rotor blade this pressure differential effectively engenders airflow circulation from the high pressure field to the low pressure field to create a tip vortex. The tip vortex is shed from the rotor blade and collides with a trailing rotor blade during a low speed, descending flight profile (BVI noise radiation is generally not a concern in other flight profiles due to the interrelationship among the freestream airflow, the rotation of the rotor blades, and/or the orientation of the rotor disk defined by the rotation of the rotor blades). The collision of the tip vortex with the trailing rotor blade induces impulsive airloading against the trailing rotor blade, creating acoustic pressure waves that are the source of BVI noise. The BVI noise signature of a rotorcraft is directly related to the magnitude of the peak-to-peak velocity across the core of the generated tip vortex.

In addition to the generation of BVI noise as described in the preceding paragraph, the tip vortex shed by each rotor blade may also impinge upon other rotor blades, the fuselage sections downstream of the main rotor assembly, the empennage structure, and/or the tail rotor blades. The impingement of the tip vortices with any of these structural elements induces vibrations therein, thereby increasing the overall vibration level of the rotorcraft.

The rotorcraft designer, therefore, attempts, to the extent practicable, taking into account, inter alia, weight, cost, efficiency, and complexity effects, to incorporate elements into the main rotor assembly that mitigate the BVI noise radiated therefrom. There are several different design options to mitigate BVI radiated noise. One design approach involves the incorporation of a tip configuration for the main rotor blade that reduces the strength of the generated tip vortex.

One design configuration involves a forward swept rotor blade wherein the vortex is generated inboardly of the tip, such inboardly generated vortex being more diffuse, i.e., reduced strength, than the tip vortex generated by a conventional rotor blade planform. Another design option is a sub-wing tip configuration wherein a sub-wing is attached to the rotor blade at the tip thereof such that the tip of the rotor blade has a dual-tip configuration. This dual-tip configuration produces two weak, corotating vortices that mix far downstream and diffuse due to viscous effects. While these design options are generally effective in mitigating the BVI noise radiated from a main rotor assembly, such design options may degrade the overall operating efficiency of the main rotor assembly. Furthermore, such design options may be difficult and/or costly to effect from a fabrication standpoint.

Another design approach involves the incorporation of tabs or flaps to mitigate BVI noise. Stationary tabs can be incorporated on the trailing edge of the main rotor blade at the tip thereof. While such tabs are effective in reducing BVI noise by disrupting the formation of tip vortices, such tabs incur a very high drag penalty, thus reducing the operational efficiency of the main rotor assembly (by requiring that extra power be delivered to the main rotor assembly to offset the profile drag losses).

A further design approach involves active control of the angle of attack of the rotating rotor blade. Oscillating flaps may be located inboard of the tip of the main rotor blade to provide a means of actively controlling the angle of attack of the rotor blade. Alternatively, a higher harmonic control scheme may be implemented by rapidly varying the pitch of the rotor blades, or the pitch of individual rotor blades may be controlled. By actively varying the angle of attack of the rotor blade, the loading of the rotor blade may be controlled to reduce the strength of the generated tip vortex, or the position of the trailing rotor blade relative to the tip vortex shed from a preceding rotor blade.

Another design approach involves channeling air to the tip of the main rotor blade and expelling such air to disrupt the formation of the tip vortex. Like the design approaches discussed in the preceding paragraphs, this design approach is relatively effective in mitigating the BVI noise radiating from the main rotor assembly. However, of all the discussed design approaches, this approach is the most disadvantageous in terms of weight penalty, increased complexity and cost, and decreased reliability and operating efficiency of the main rotor system.

A need exists to provide a means for reducing the BVI noise radiated from rotor blades, and in particular, from the main rotor blades of a rotorcraft main rotor assembly. The means should not significantly impair the operating efficiency of the main rotor assembly, e.g., increased power requirements or increased profile drag, and should not result in a significant increase in the weight, cost, reliability, or complexity of the main rotor assembly.

DISCLOSURE OF THE INVENTION

One object of the present invention is to provide a half-plow vortex generator for use with a rotor blade, particularly a rotorcraft main rotor blade, that is operative to generate a primary corotating vortex of sufficient strength to interact with and dissipate the tip vortex generated by the same rotor blade.

Another object of the present invention is to provide a half-plow vortex generator having a right triangular planform configuration that is defined by a length, a width, and an apex angle, and an apex height, which in combination with the length, width, and apex angle, defines the three-dimensional configuration of the half-plow vortex generator.

A further object of the present invention is to provide a half-plow vortex generator that is mountable in combination with an aerodynamic surface of the rotor blade with the length thereof in substantial alignment with a local chord of the rotor blade.

Yet another object of the present invention is to provide a half-plow vortex generator wherein the apex height, the length, and the width of each half-plow vortex generator mounted in combination with the rotor blade are defined in terms of the local chord of the rotor blade at the half-plow vortex generator mounting site.

Still a further object of the present invention is to provide a half-plow vortex generator mounted inboardly from the tip of the rotor blade a predetermined spanwise distance therefrom wherein the predetermined spanwise distance is defined in terms of the tip chord length and wherein the half-plow vortex generator is further mounted inwardly from the leading edge of the rotor blade by a predetermined chordal distance wherein the predetermined chordal distance is defined in terms of the local chord length.

These and other objects are achieved by a vortex generator system for use with a rotor blade, particularly a rotorcraft main rotor blade, defined by a tip chord that comprises a half-plow vortex generator having a right triangular planform which is defined by a length, a width, and an apex angle. The half-plow vortex generator further comprises an apex height, which in combination with the length, width, and apex angle, defines the three-dimensional configuration of the half-plow vortex generator. The half-plow vortex generator is mountable in combination with an aerodynamic surface of the rotor blade with the length thereof in substantial alignment with a local chord of the rotor blade.

The apex height, length, and width of the half-plow vortex generator have magnitudes that are defined in terms of the local chord at the mounting site of the half-plow vortex generator.

The half-plow vortex generator is mounted inboardly from the tip of the rotor blade a predetermined spanwise distance that is defined in terms of the tip chord length. The half-plow vortex generator is further mounted inwardly from the leading edge of the rotor blade by a predetermined chordal distance that is defined in terms of the local chord length.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

Figure 1:
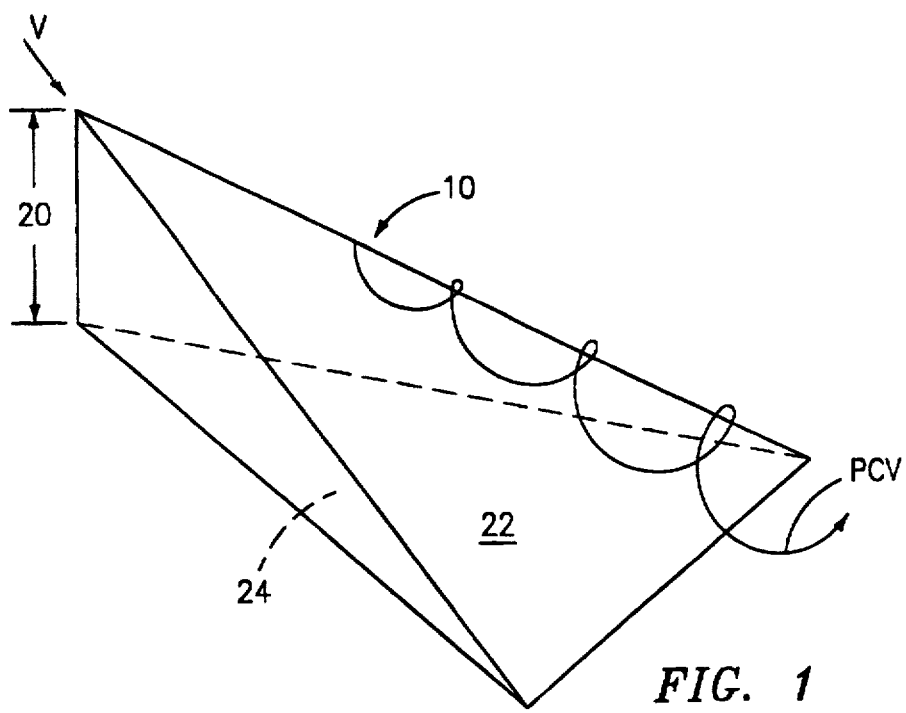
FIG. 1 is a perspective view of a half-plow vortex generator according to the present invention.
Figure 2:
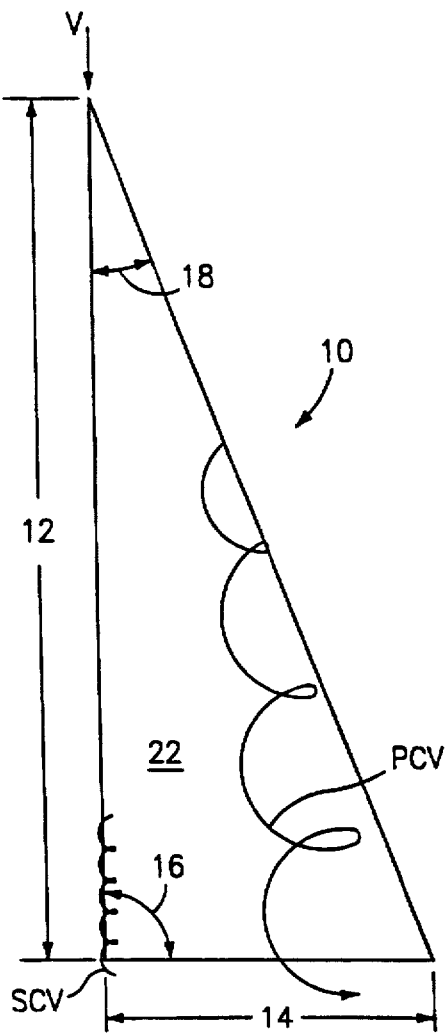
FIG. 2 is a top plan view of the half-plow vortex generator of FIG. 1.

Referring now to the drawings wherein like reference characters identify corresponding or similar elements throughout the several views, FIGS. 1–2 illustrate a "half-plow" vortex generator 10 according to the present invention for a rotorcraft main rotor assembly, e.g., a helicopter main rotor assembly. While the vortex generator 10 according to the present invention is described herein in terms of the main rotor blades of a helicopter main rotor assembly, one skilled in the art will appreciate that the vortex generator 10 may have utility for use in combination with other types of rotating blades, e.g., the blades of a tiltrotor aircraft.

Figure 4:
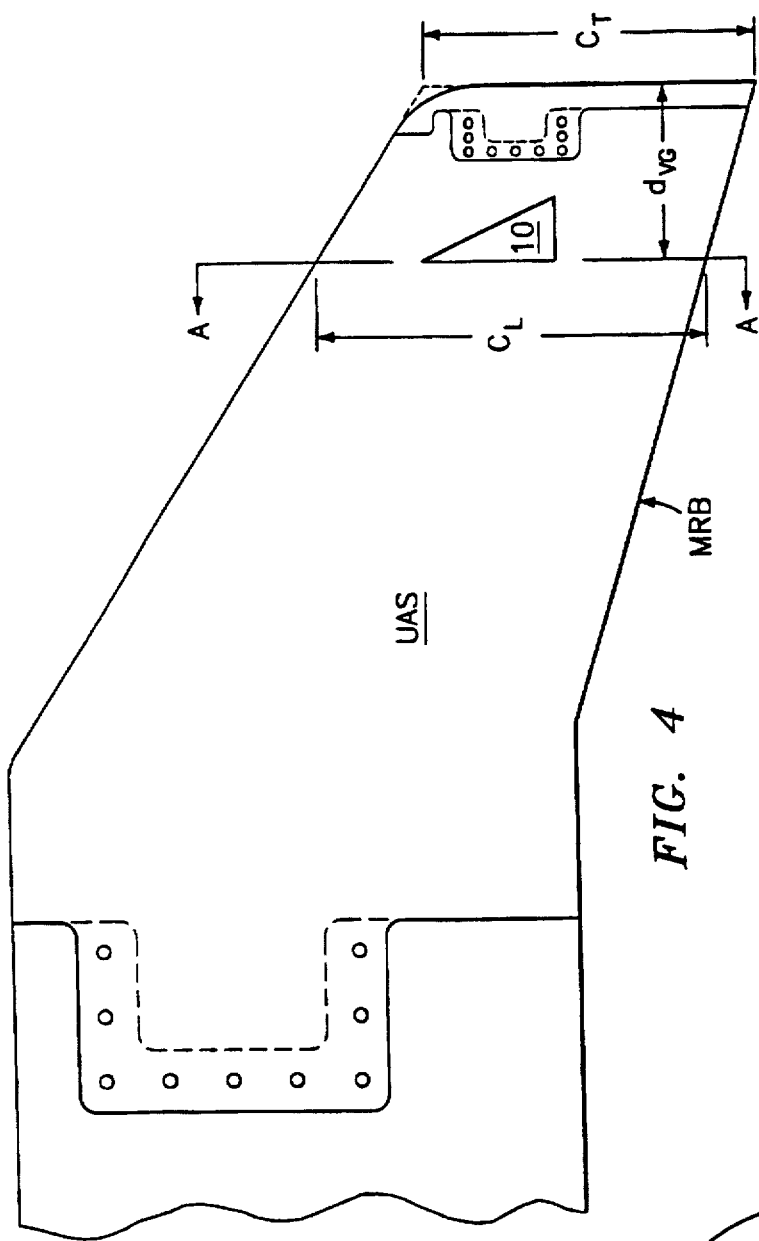
FIG. 4 is a top plan view of the tip end of an exemplary main rotor blade illustrating one use of the half-plow vortex generator according to the present invention wherein the vortex generator is mounted in combination with the upper aerodynamic surface of the exemplary main rotor blade.
Figure 5:
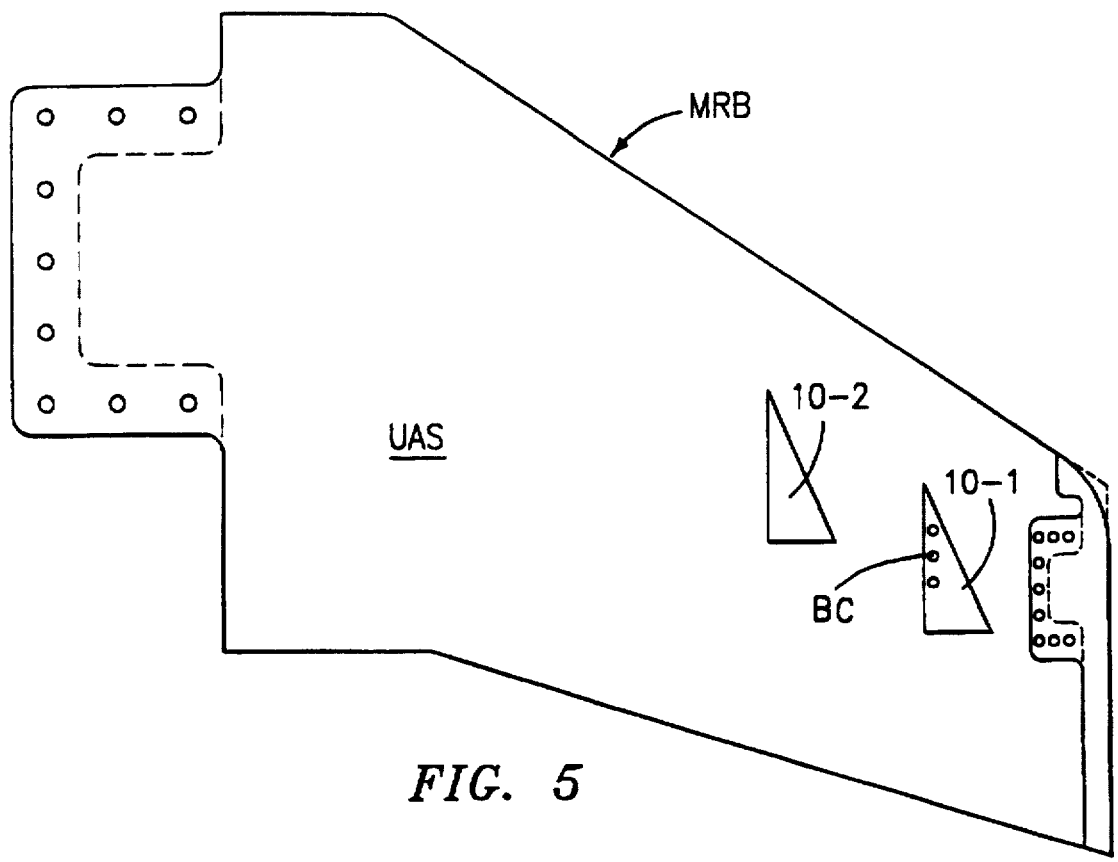
FIG. 5 is a top plan view of the tip end of an exemplary main rotor blade illustrating another use of the half-plow vortex generator according to the present invention wherein first and second vortex generators are mounted in combination with the upper aerodynamic surface of the exemplary main rotor blade.

At least one half-plow vortex generator 10 is mounted in combination with the aerodynamic surface (preferably the upper aerodynamic surface) of each main rotor blade of a helicopter main rotor assembly at the tip thereof (see, e.g., FIGS. 4–5). The vortex generator 10 is operative to generate a primary corotating vortex that interacts with the tip vortex formed by the same main rotor blade. The terminology "corotating" is used herein to indicate that the generated primary corotating vortex has the same sense of airflow circulation as the shed tip vortex, e.g., counterclockwise; the generated primary corotating vortex is indicated by the reference characters PCV in FIGS. 1, 2. During typical descent flight operations of a helicopter, the tip of the main rotor blade is subjected to positive loading, and the tip vortex generated as a result of such positive tip loading is designated as a positive tip vortex. An examination of FIG. 2 shows that the half-plow vortex generator 10 also generates a secondary corotating vortex SCV.

The primary corotating vortex PCV generated by the vortex generator 10 has a strength, where strength is defined by the magnitude of the peak-to-peak velocity across the vortex core, i.e., $V_{pp}$, that is approximately equal to or slightly greater than the strength of the positive tip vortex formed and shed by the same main rotor blade, i.e., $V_{pp}$ is within the range of $1.0 < x < 1.2$. The primary corotating vortex PCV interacts by airflow mixing and merges with the positive tip vortex formed by the same main rotor blade to cause accelerated dissipation of the merged vortices due to viscosity, i.e., the strength of merged vortices is significantly reduced. The reduced strength of the positive tip vortex, in turn, reduces the BVI noise radiated by the trailing main rotor blade since the impulse airloading on the trailing main rotor blade is diminished as a result of the abated strength of the positive tip vortex. In addition to BVI noise reduction, the reduced strength of the positive tip vortex, due to the operation of the half-plow vortex generator 10 according to the present invention, also results in an overall reduction of the vibration levels of the rotorcraft since the vibrations induced by positive tip vortices in the other rotor blades, the downstream fuselage sections, the empennage structure, and/or the tail rotor blades are concomitantly reduced.

The secondary corotating vortex SCV generated by the vortex generator 10 also interacts by mixing and merges with the positive shed tip vortex. However, inasmuch as the strength of the secondary corotating vortex SCV is much less than the strength of the primary corotating vortex PCV, the secondary corotating vortex SCV is not a significant contributing factor in BVI noise reduction such that its effects may generally be ignored.

Based upon numerical and experimental results, it is estimated that the use of half-plow vortex generators 10 according to the present invention results in a fifty percent reduction in the peak-to-peak velocity of the positive tip vortex shed by each main rotor blade, thereby providing about a 3 dB reduction in the overall BVI noise level radiated by a rotorcraft main rotor assembly.

With reference to FIGS. 1–2, the vortex generator 10 has a right triangle planform configuration defined by a length 12, a width 14, a ninety degree angle 16, and an apex angle 18. The three-dimensional configuration of the vortex generator 10 is further defined by an apex height 20, a backface surface 22, and an interface surface 24. The "half-plow" terminology is used to describe the vortex generator 10 based upon the foregoing configurational characteristics (as contrasted with a "full-plow" configuration, i.e., isosceles triangle planar configuration having an equal length but wherein the apex angle and the width are twice the magnitude of a corresponding half-plow configuration). The half-plow configuration is functionally superior to a "full plow" configuration inasmuch as the half plow configuration weighs less than a corresponding full-plow configuration, and is relatively insensitive, as compared to the full plow configuration, to the angle of attack of the main rotor blade. More importantly, the half-plow configuration exhibits lower profile drag characteristics than a corresponding full plow configuration.

Figure 3:
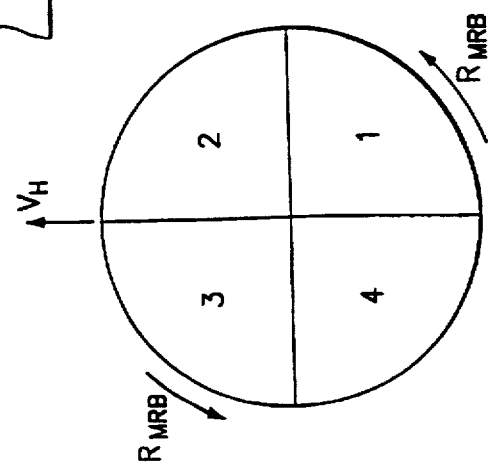
FIG. 3 is a top plan view (looking downwardly) of the rotor disk defined by the rotation of the main rotor blades of a rotorcraft main rotor assembly.

Any source of profile drag associated with the rotor assembly, e.g., the main rotor blades, degrades the operational efficiency of the rotor assembly. Accordingly, the design engineer generally performs a trade-off analysis to determine whether the functional benefits associated with a design improvement for a main rotor assembly outweighs the profile drag associated with such design improvement. Referring to FIG. 3, which is a downward view of the rotor disk defined by the rotating main rotor blades (reference character $R_{MRB}$ defines the direction of rotation of the main rotor blades, i.e., counterclockwise, and reference character $V_H$ defines the direction of movement of the rotorcraft), it has been determined that the most significant component of BVI radiated noise is produced in the first quadrant of the rotor disk. This component of BVI radiated noise is a result of tip vortices that are generated by the rotating main rotor blades in the second quadrant and that interact with the trailing main rotor blades in the first quadrant. This phenomenon is due to the particular interrelationship between the freestream airflow and the rotating main rotor blades in the second quadrant.

It was recognized that the effectiveness of each vortex generator 10 according to the present invention in reducing BVI radiated noise is primarily due to the functioning thereof in the second quadrant, i.e., the primary corotating vortices PCV generated in the second quadrant. In the first, third, and fourth quadrants, concomitantly, each vortex generator 10 is primarily acting as a source of profile drag losses. The half-plow vortex generator 10 having a three-dimensional configuration as described herein is the optimal design configuration for effectively reducing BVI radiated noise while concomitantly minimizing profile drag losses experienced by the main rotor assembly.

The vortex generator 10 of the present invention is preferably formed from a material that: (i) is inert with respect to the material comprising the aerodynamic surface of the main rotor blade, e.g., no galvanic reaction between the vortex generator 10 and the main rotor blade, (ii) has sufficient mechanical strength to withstand the aerodynamic forces acting on the main rotor blade, e.g., freestream airflow, particulate matter such as dust or water; and (iii) has a low density. For example, for main rotor blades fabricated from a composite material, the vortex generator 10 can be fabricated from the corresponding resinous matrix material comprising the composite material, e.g., a thermoset or thermoplastic material. For metallic main rotor blades, e.g., aluminum aerodynamic surfaces, the vortex generator 10 may be fabricated from a compatible metallic material, e.g., aluminum, or a thermoset or thermoplastic material that is inert with respect to the metallic aerodynamic surface.

The vortex generator 10 is fabricated using a suitable, conventional manufacturing technique. The vortex generator 10 may be fabricated from the selected material as a solid, three-dimensional structure. Preferably, however, the vortex generator 10 is fabricated as a hollow, three-dimensional structure that may be filled with a lower density material, e.g., polyurethane foam, for structural integrity while concomitantly reducing the weight of the vortex generator 10 (and concomitantly, the overall system weight of the main rotor assembly).

Figure 4A:
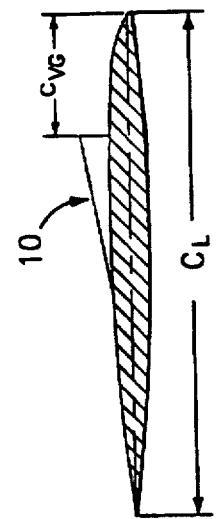
FIG. 4A is a cross-sectional view of the exemplary main rotor blade of FIG. 4 taken along line A—A thereof.

The configurational parameters that define the half-plow vortex generator 10, i.e., length 12, width 14, and apex height 20, are based upon the local chord length $C_L$ at the rotor blade radial station (as used herein radial station is defined as the radial distance from the rotational center of the rotor assembly to such local chord) where the vortex generator 10 is mounted in combination with the rotor blade(see FIGS. 4, 4A). The apex height 20 of the vortex generator 10 is the critical parameter inasmuch as the apex height 20 is not only the primary determinant of the strength of the primary corotating vortex PCV generated by the vortex generator 10, but also defines the profile drag losses associated with the vortex generator 10. The apex height 20 of the vortex generator 10 also influences the manner in which the vortex generator 10 is mounted in combination with the aerodynamic surface of the main rotor blade.

There are two schemes for mounting the vortex generator 10 in combination with the main rotor blade, depending primarily on the apex height 20 of the vortex generator 10: passive or active. Preferably, the vortex generator 10 is mounted in passive combination with the aerodynamic surface of the main rotor blade by an appropriate technique, e.g., bonding or mechanically securing the interface surface 24 of the vortex generator 10 to the aerodynamic surface of the main rotor blade. In the passive scheme, the vortex generator 10 is permanently exposed to and interacts with the freestream airflow over the main rotor blade. The passive scheme has the advantages of being low weight, simple, inexpensive, highly reliable, and readily installed in combination with the main rotor blade. On the negative side, however, since the vortex generator 10 continuously interacts with the freestream airflow over the main rotor blade, profile drag losses are experienced in all four quadrants of the rotor disk.

In the active scheme, the vortex generator 10 is mounted in rotatable combination (at the width 14 edge thereof) with respect to the aerodynamic surface of the main rotor blade so that the vortex generator 10 is alternatively sequenced between a deployed state or a retracted state with respect to the aerodynamic surface with the result that the vortex generator 10 is only intermittently exposed to and interactive with the freestream airflow over the main rotor blade. In the deployed state, the apex height 20 of the vortex generator 10 extends above aerodynamic surface while in the retracted state the backface surface 22 of the vortex generator 10 is flush with the aerodynamic surface. In one active deployment scheme, the vortex generator 10 is deployed only for the limited time period during which the rotorcraft is operating in a flight profile wherein significant BVI noise is being radiated from the main rotor assembly. In a variation on the foregoing active deployment scheme, the vortex generator 10 is intermittently deployed during the limited time period so that the vortex generator 10 is only exposed during rotation of the main rotor blade in the second quadrant.

The active scheme significantly reduces profile drag losses due to the vortex generator 10 since the vortex generator 10 is only deployed intermittently during the limited time period or only in the second quadrant during the limited time period, i.e., pragmatically, profile drag losses are experienced only during the limited time period or only in the second quadrant of the rotor disk during the limited time period. The active scheme, however, incurs a weight penalty, is more complex, more costly, less reliable, and gives rise to installation and functional complexities as contrasted with the passive scheme. For example, the aerodynamic surface of the main rotor blade must be fabricated to include a receptacle for housing the vortex generator 10 in the retracted position, an actuating means, e.g., electromagnetic, piezoelectric, magnetostrictive, shape-memory alloy, piston, must be disposed in combination with the vortex generator 10 to provide for the cyclic deployment and retraction of the vortex generator 10, and a regulating means, e.g., a software subroutine in the automatic flight control system and associated circuitry, must be provided to accurately control the deployment and retraction of the vortex generator 10.

The apex height 20 of the vortex generator 10 is defined in terms of the local chord length $C_L$ (see FIGS. 4, 4A) at the mounting site, i.e., radial station, where the vortex generator 10 is mounted to the aerodynamic surface of the main rotor blade. The magnitude of the apex height 20 of the vortex generator 10 is preferably within the range of about $0.01C_L<$height $20<0.08C_L$, and more preferably, the magnitude of the apex height 20 is about $0.04C_L$. One strong consideration in selecting the appropriate apex height 20 for the vortex generator 10 for use in combination with a main rotor blade is the magnitude of the Reynolds number of the freestream airflow over the main rotor blade. Generally, a vortex generator 10 having an apex height 20 within the preferable range described hereinabove is sufficient for generating a primary corotating vortex PCV with sufficient strength to significantly abate the positive tip vortex shed by the same main rotor blade.

The length 12, width 14, and apex angle 18 of the vortex generator 10 are secondary determinants that define the strength of the primary corotating vortex PCV generated by the vortex generator 10. The length 12 of the vortex generator 10 is also defined by chord length $C_L$. The length 12 is preferably within the range of about $¼C_L<$length $12<½C_L$. The width 14 of the vortex generator 10 is preferably about one-third of the length 12, i.e., defined by the ratio width 14/length 12 approximately equal to one-third. The apex angle 18 of the vortex generator 10 is preferably within the range of about 20°<apex angle 18<30°, and the described embodiment the apex angle 18 has a magnitude of about 23°.

The mounting site, i.e., spanwise distance from the tip of the main rotor blade and chordal distance from the leading edge of the main rotor blade, of the vortex generator 10 is defined in terms of the length of the tip chord $C_T$ and the length of the local chord $C_L$, respectively, of the main rotor blade. With reference to FIG. 4, the length 12 edge of the vortex generator 10 is positioned inboardly a spanwise distance dvG from the tip of the main rotor blade. One skilled in the art will appreciate that there is a direction correlation between defining the mounting site in terms of the radial station (as described hereinabove) and the spanwise distance $d_{VG}$, i.e., the radial station equals the radius of the rotor blade minus the spanwise distance $d_{VG}$, such that the mounting site can be defined in terms of either the radial station or the spanwise distance $d_{VG}$. The spanwise distance $d_{VG}$ is selected to ensure that the primary corotating vortex PCV generated by the vortex generator 10 sufficiently interacts with the associated positive tip vortex to significantly reduce the strength thereof before interaction with a trailing main rotor blade. Preferably, the spanwise distance $d_{VG}$ is within the range of about $½C_T<d_{VG}<1$ $C_T$. Furthermore, the length 12 edge of the vortex generator 10 is preferably aligned with the local chord $C_L$ although a minor skewing of the length 12 edge with respect to the local chord $C_L$ does not significantly degrade the functional efficiency of the vortex generator 10, i.e., the strength of the generated primary corotating vortex PCV.

The apex of the vortex generator 10 is positioned inwardly a chordal distance cvG from the leading edge of the main rotor blade (see FIG. 4A). Preferably, the chordal distance $c_{VG}$ is about one quarter of the length of the local chord $¼C_L$ i.e., $c_{VG} \approx ¼C_L$.

FIGS. 4, 4A illustrate one preferred embodiment of a half-plow vortex generator scheme according to the present invention wherein the vortex generator 10 has configurational characteristics as described hereinabove and is mounted in combination with the upper aerodynamic surface UAS of the main rotor blade MRB as described in the preceding paragraph. The interface surface 24 of the vortex generator 10 may be complementary to the upper aerodynamic surface UAS of the main rotor blade MRB to facilitate passive mounting of the vortex generator 10 in combination with the main rotor blade MRB. Alternatively, the backface surface 22 may be complementary to the upper aerodynamic surface UAS to facilitate active mounting of the vortex generator 10 in combination with the main rotor blade MRB. The vortex generator 10 is operative to generate a primary corotating vortex to interact with the positive tip vortex produced by the same main rotor blade MRB to reduce the strength thereof such that BVI noise is diminished.

FIG. 5 illustrates another embodiment of a half-plow vortex generator scheme according to the present invention wherein a first half-plow vortex generator 10-1 has the configurational characteristics and is mounted in combination with the upper aerodynamic surface UAS of the main rotor blade as described in the preceding paragraphs. A second half-plow vortex generator 10-2 having configurational characteristics similar to the first half-plow vortex generator 10-1 is mounted inboardly of the first half-plow vortex generator 10-1. The mounting site for the second half-plow vortex generator 10-2 is generally as described hereinabove except that the spanwise distance of the second half-plow vortex generator 10-2 is referenced from the first half-plow vortex generator 10-1 (rather than the tip of the main rotor blade).

It has been determined that under certain helicopter flight conditions, e.g., high speed forward flight with an advance ratio greater than 0.175, the tip of the main rotor blade is subject to negative loading and positive loading occurs inboardly of the tip in the second quadrant. As a result of the negative tip loading and positive inboard loading experienced by the main rotor blade, the main rotor blade generates dual, counter-rotating vortices wherein the tip vortex is negative and the inboard vortex is positive. The positive inboard vortex is approximately three to five times as strong as the negative tip vortex.

The dual half-plow vortex generator scheme described immediately hereinabove is designed to provide BVI noise abatement for those flight conditions wherein dual, counter-rotating vortices are generated by the main rotor blade. Preferably, the first half-plow vortex generator 10-1 is passively mounted in combination with the upper aerodynamic surface UAS of the main rotor blade MRB (see FIG. 5 wherein bolted connections BC provide the mechanical securement of the first vortex generator 10-1 in combination with the main rotor blade MRB) inasmuch as the first half-plow vortex generator 10-1 is also functional to provide BVI noise abatement during other flight conditions, e.g., the descent mode. The second half-plow vortex generator 10-2 may be actively mounted to reduce the parasitic drag effects thereof during flight conditions wherein dual counter-rotating vortices are not formed.

Figure 6:
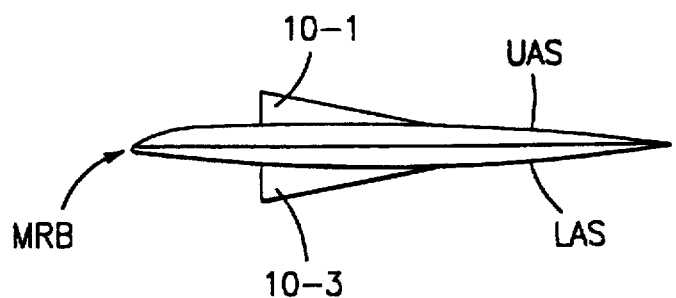
FIG. 6 is an end plan view of the tip end of an exemplary main rotor blade illustrating yet a further use of the half-plow vortex generator according to the present invention wherein vortex generators are symmetrically mounted (same radial station) in combination with the upper and lower aerodynamic surfaces of the exemplary main rotor blade.

FIG. 6 illustrates yet another embodiment of a half-plow vortex generator scheme according to the present invention. A first half-plow vortex generator 10-1 having the configurational characteristics described hereinabove is mounted in combination with the upper aerodynamic surface UAS of the main rotor blade MRB as described hereinabove. A second half-plow vortex generator 10-3 having the configurational characteristics described hereinabove is mounted in combination with the lower aerodynamic surface LAS of the main rotor blade MRB. The second half-plow vortex generator 10-3 is mounted along the same local chord $C_L$ as the first half-plow vortex generator 10-1, i.e., symmetrical or aligned mounting.

Other half-plow vortex generator schemes include multiples of half-plow vortex generators 10 mounted on the upper and/or lower aerodynamic surfaces of a main rotor blade. For example, another half-plow vortex generator scheme according to the present invention comprises two half-plow vortex generators mounted in combination with the upper aerodynamic surface UAS of the main rotor blade MRB as illustrated in FIG. 5 (half-plow vortex generators 10-1, 10-2) and a single half-plow vortex generator mounted in combination with the lower aerodynamic surface LAS of the main rotor blade MRB as illustrated in FIG. 6 (half-plow vortex generator 10-3). The upper surface half-plow vortex generators 10-1, 10-2 have configurational characteristics and mounting sites as described hereinabove with respect to the embodiment depicted in FIG. 5 and the lower surface half-plow vortex generator 10-3 has configurational characteristics and a mounting site as described hereinabove with respect to the embodiment depicted in FIG. 6. That is, the configuration characteristics of the half-plow vortex generators 10-1, 10-2, 10-3 are based upon the length of the local chord $C_L$ of the most outboardly half-plow vortex generator 10-1. The mounting sites for the half-plow vortex generators 10-1, 10-2, 10-3 are as described hereinabove with respect to FIGS. 5 and 6, respectively.

Other multiple half-plow vortex generator schemes wherein up to three half-plow vortex generators are mounted in combination with the upper aerodynamic surface of the rotor blade and up to three half-plow vortex generators are mounted in combination with the lower aerodynamic surface of the rotor blade are within the scope of the present invention. The half-plow vortex generators comprising each such scheme have substantially similar configurational characteristics, such configurational characteristics being based upon the local chord $C_L$ mounting site of the most outboardly half-plow vortex generator (e.g., half-plow vortex generator 10-1 illustrated in FIG. 5). Spacing between the half-plow vortex generators mounted in combination with the upper aerodynamic surface are based upon the length of the tip chord $C_T$ as described hereinabove. For such schemes, each half-plow vortex generator mounted in combination with the lower aerodynamic surface is aligned with the corresponding half-plow vortex generator of the upper aerodynamic surface.

A variety of modifications and variations of the present invention are possible in light of the above teachings. It is therefore to be understood that, within the scope of the appended claims, the present invention may be practice otherwise than as specifically described hereinabove.

What is claimed is:

1. A vortex generator system for use with a rotor blade defined by a tip chord, comprising:

a half-plow vortex generator having a right triangular planform configuration;

said right triangular planform configuration being defined by a length, a width, and an apex angle, and an apex height;

said apex height, in combination with said length, said width, and said apex angle of said right triangular planform configuration defining the three-dimensional configuration of said half-plow vortex generator; and wherein said half-plow vortex generator is mounted in combination with an aerodynamic surface of the rotor blade at a mounting site defined by a local chord, said mounting site being inboardly from the tip of the rotor blade a predetermined spanwise distance from the tip of the rotor blade, said predetermined spanwise distance being defined in terms of the tip chord length, and wherein said half-plow vortex generator is further mounted inwardly from the leading edge of the rotor blade by a predetermined chordal distance, said predetermined chordal distance being defined in terms of the length of said local chord; and wherein said length of said mounted half-plow vortex generator is substantially aligned with said local chord;

said apex height of said half-plow vortex generator has a magnitude defined in terms of said local chord;

said length of said half-plow vortex generator has a magnitude defined in terms of said local chord;

said width of said half-plow vortex generator has a magnitude defined in terms of said local chord.

2. The vortex generator system of claim 1 wherein said magnitude of said apex height is within the range of about 0.01 to about 0.08 of the magnitude of said local chord.

3. The vortex generator system of claim 2 wherein said magnitude of said apex height is about 0.04 of the magnitude of said local chord.

4. The vortex generator system of claim 1 wherein said magnitude of said length is within the range of about one-quarter to about one-half of the magnitude of said local chord.

5. The vortex generator system of claim 1 wherein said magnitude of said width is about one-third of said magnitude of said length of said half-plow vortex generator.

6. The vortex generator system of claim 1 wherein said apex angle has a value within the range of about twenty degrees to about thirty degrees.

7. The vortex generator system of claim 6 wherein said apex angle has a value of about twenty-three degrees.

8. The vortex generator system of claim 1 wherein said predetermined spanwise distance has a magnitude within the range of about one-half to about equal to the magnitude of the tip chord.

9. The vortex generator system of claim 1 wherein said predetermined chordal distance has a magnitude approximately equal to one-quarter of the magnitude of said local chord.

10. The vortex generator system of claim 1 wherein said aerodynamic surface is an upper aerodynamic surface and wherein said half-plow vortex generator is passively mounted in combination with said upper aerodynamic surface.

11. The vortex generator system of claim 1 wherein said aerodynamic surface is an upper aerodynamic surface and wherein said half-plow vortex generator is actively mounted in combination with said upper aerodynamic surface such that said half-plow vortex generator can be sequenced between a deployed state and a retracted state.

12. The vortex generator system of claim 1 wherein said half-plow vortex generator is defined as a first half-plow vortex generator, and wherein said vortex generator system further comprises a second half-plow vortex generator mounted in combination with the rotor blade, said second half-plow vortex generator having a length, a width, an apex angle, and an apex height, and wherein said length, said width, and said apex height of said second half-plow vortex generator are defined in terms of the magnitude of said local chord of said first half-plow vortex generator.

13. The vortex generator system of claim 12 wherein said aerodynamic surface is an upper aerodynamic surface and wherein said first and second half-plow vortex generators are mounted in combination with said upper aerodynamic surface.

14. The vortex generator system of claim 12 wherein said aerodynamic surface is an upper aerodynamic surface and wherein said first half-plow vortex generator is mounted in combination with said upper aerodynamic surface, and further wherein said second half-plow vortex generator is mounted in combination with said lower aerodynamic surface of the rotor blade in symmetrical relation to said first half-plow vortex generator.

15. The vortex generator system of claim 1 wherein said half-plow vortex generator is defined as a first half-plow vortex generator, and wherein said vortex generator system further comprises second and third half-plow vortex generators mounted in combination with the rotor blade, said second and third half-plow vortex generators each having a length, a width, an apex angle, and an apex height, and wherein said length, said width, and said apex height of said second and third half-plow vortex generators are defined in terms of the magnitude of said local chord of said first half-plow vortex generator, and wherein said first and second half-plow vortex generators are mounted in combination with said upper aerodynamic surface of the rotor blade and said third half-plow vortex generator is mounted in combination with said lower aerodynamic surface of the rotor blade in symmetrical relation to said first half-plow vortex generator.

16. The vortex generator system of claim 1 wherein said half-plow vortex generator is defined as a first half-plow vortex generator mounted in combination with said upper aerodynamic surface, and wherein said vortex generator system further comprises at least one and no more than two half-plow vortex generators mounted in combination with said upper aerodynamic surface of the rotor blade and at least one and no more than three half-plow vortex generators mounted in combination with said lower aerodynamic surface of the rotor blade, and wherein each of said half-plow vortex generators mounted in combination with said upper aerodynamic surface of the rotor blade and each of said half-plow vortex generators mounted in combination with said lower aerodynamic surface has a length, a width, an apex angle, and an apex height, and wherein said length, said width, and said apex height of said half-plow vortex generators are defined in terms of the magnitude of said local chord of said first half-plow vortex generator, and wherein each said half-plow vortex generator mounted in combination with said lower aerodynamic surface of the rotor blade is aligned in symmetrical relation with a corresponding one of said half-plow vortex generators mounted in combination on said upper aerodynamic surface of the rotor blade.

17. A half-plow vortex generator for use in mounted combination with a rotor blade defined by a tip chord, comprising:

a right triangular planform configuration being defined by a length, a width, and an apex angle; and an apex height, which in combination with said length, said width, and said apex angle of said right triangular planform configuration, defines the three-dimensional configuration of said half-plow vortex generator; and wherein said half-plow vortex generator is mounted in combination with the upper aerodynamic surface of the rotor blade at a mounting site defined by a local chord, said mounting site being inboardly from the tip of the rotor blade a predetermined spanwise distance having a magnitude within the range of about one-half to about equal to the tip chord length, and wherein said half-plow vortex generator is further mounted inwardly from the leading edge of the rotor blade by a predetermined chordal distance having a magnitude of about one-quarter of the magnitude of said local chord; and wherein said length of said mounted half-plow vortex generator is substantially aligned with said local chord;

said apex height of said half-plow vortex generator has a magnitude within the range of about 0.01 to about 0.08 of the magnitude of said local chord;

said length of said half-plow vortex generator has a magnitude within the range of about one-quarter to about one-half of the magnitude of said local chord;

said width of said half-plow vortex generator has a magnitude of about one-third of said length; and said apex angle has a value within the range of about twenty degrees to about thirty degrees.

* * * * *

UNITED STATES PATENT AND TRADEMARK OFFICE
CERTIFICATE OF CORRECTION

PATENT NO : 5,785,282
DATED : July 28, 1998
INVENTOR(S): Wake et al

It is certified that error appears in the above-identified patent and that said Letters Patent is hereby corrected as shown below:

On the Title Page "[75] Inventors:" after Brian E. Wake, Portland, CT; insert "T. Alan Egolf, Glastonbury, CT;"

Signed and Sealed this

Tenth Day of November 1998

Attest:

BRUCE LEHMAN

Attesting Officer     Commissioner of Patents and Trademarks